Jan. 24, 1956  P. M. LEMOIGNE  2,732,245
AUTOMATIC PARACHUTE RELEASE COUPLING
Filed April 22, 1953  3 Sheets-Sheet 1

Inventor
P. M. Lemoigne

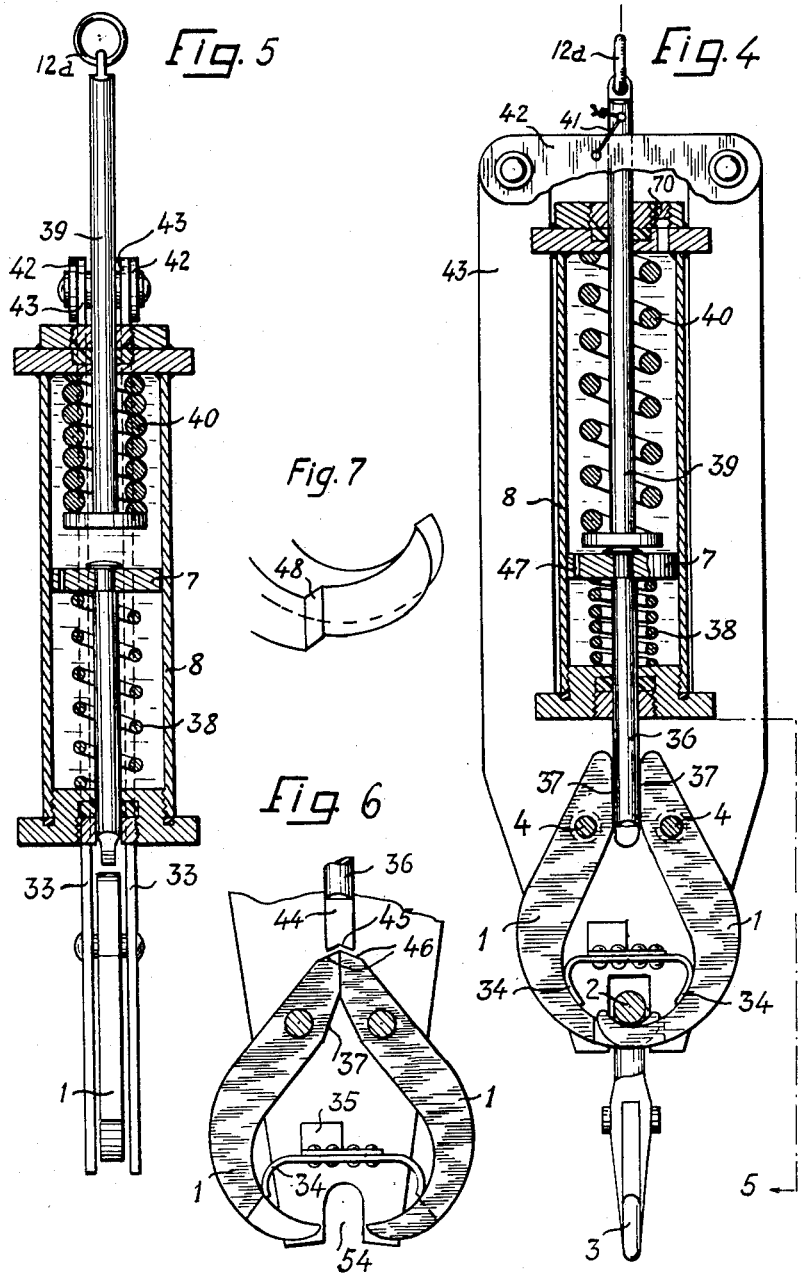

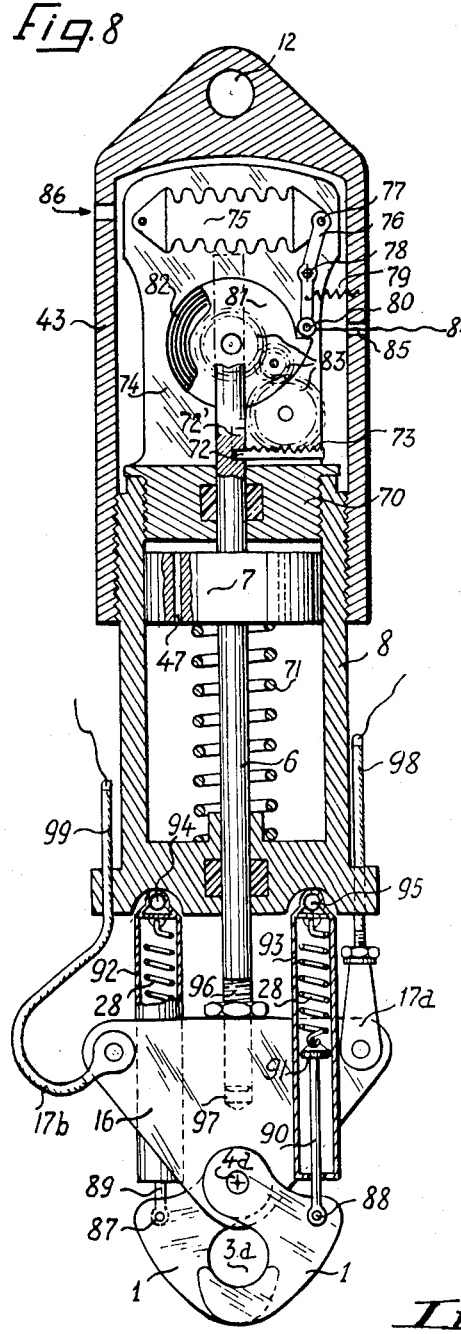

United States Patent Office 2,732,245
Patented Jan. 24, 1956

2,732,245

AUTOMATIC PARACHUTE RELEASE COUPLING

Pierre Marcel Lemoigne, Montrouge, France

Application April 22, 1953, Serial No. 350,376

Claims priority, application France May 5, 1952

12 Claims. (Cl. 294—83)

This invention relates to a parachute release for automatically releasing a parachute-borne load upon reaching the ground, or other support when dropped from aircraft.

In the parachuting of a load from an airplane, it is important that the load be safely secured to the parachuting means during its descent and to immediately release the load from said parachuting means, when striking the ground, or other supporting surface, in order that the load will not be dragged over said supporting surface by the parachute under pocketing of wind therein.

It is accordingly an object of the present invention to provide an automatic release coupling between the parachuting means and the load by means of which the load is safely secured in suspension position during descent of the parachute, while, as soon as the load reaches the ground or other supporting surface, so that the parachuting means is relieved of the weight thereof, the coupling will automatically open to detach the load from the parachuting means.

During the descent, it may happen that the effective weight of the load is momentarily reduced due to the irregularities of the descent. In these conditions, it is very important that the security of the attachment of the load be independent of the effective weight thereof.

It is accordingly another object of the invention to provide a parachute release coupling of the type described in which the load suspending means remain locked in operative position, even if the effective value of the load becomes very small.

On the other hand, it is known that the opening of a parachute gives rise to a sudden and considerable shock, which is liable to cause bouncing of the load on its suspension means.

A further object of the invention is to provide, in a coupling of the type described, additional safety locking means adapted to hold the load-suspension means in safe locked condition, at least until all parachuting means associated with the load have been fully opened.

When the load has been released, it is important that the automatic release coupling remains in condition of operation and, in particular, that no portion thereof be disconnected therefrom.

Another object of the invention is therefore to provide a coupling of the type described, in which the load releasing coupling remains intact so that it is available for repeated use without need of replacement parts.

A further object of the invention is to provide a device of the character described, of simple and practical construction, which is efficient and reliable in operation, relatively inexpensive to manufacture and, otherwise, well adapted for the purposes for which the same is intended.

The above-mentioned additional safety locking means are essentially constituted by a dash-pot, the piston of which is armed before parachuting and in which a given stroke of said piston from its armed position is necessary to unlock the load-suspension means which are thereupon held in their operative position only due to the suspension on said means of an element fast with the load.

A more particular object of the invention is to use the displacement of the dash-pot piston to trigger a number of operations associated with the parachuting of the load, such as the opening of one or more additional landing parachutes.

Still a further object of the invention is to provide a device of the type described in the last paragraph in which the rate of flow through the dash-pot is adjustable, which permits varying the instant, or instants, of triggering of said operations.

Other objects and advantages of the invention will be apparent from the following detailed description, together with the accompanying drawing, submitted for purposes of illustration only and not intended to define the scope of the invention, reference being had for that purpose to the subjoined claims.

In these drawings:

Figs. 4 and 5 are two right-angled partly sectional views the latter along line 5—5 of Fig. 4 of another embodiment in which the device according to the invention comprises only a mechanism for releasing the load.

Fig. 6 is a detailed view of the mechanism of Figs. 4 and 5 after releasing with a slight modification of the lock.

Fig. 7 is a detailed view of the active end of one hook of the releasing mechanism of Figs. 4 to 6.

Fig. 8 is an axial sectional view of another embodiment in which the device is provided with an adjustable aneroid ensuring one or more triggerings as a function of altitude.

Figures 2, 3:
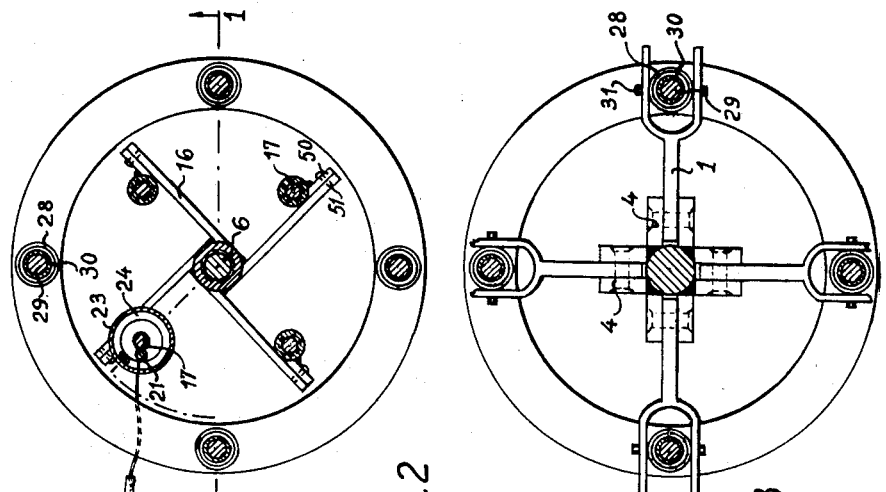
Fig. 2 is a cross-sectional view along line 2—2 of Fig. 1.
Fig. 3 is a cross-sectional view along line 3—3 of Fig. 1.
Figure 1:
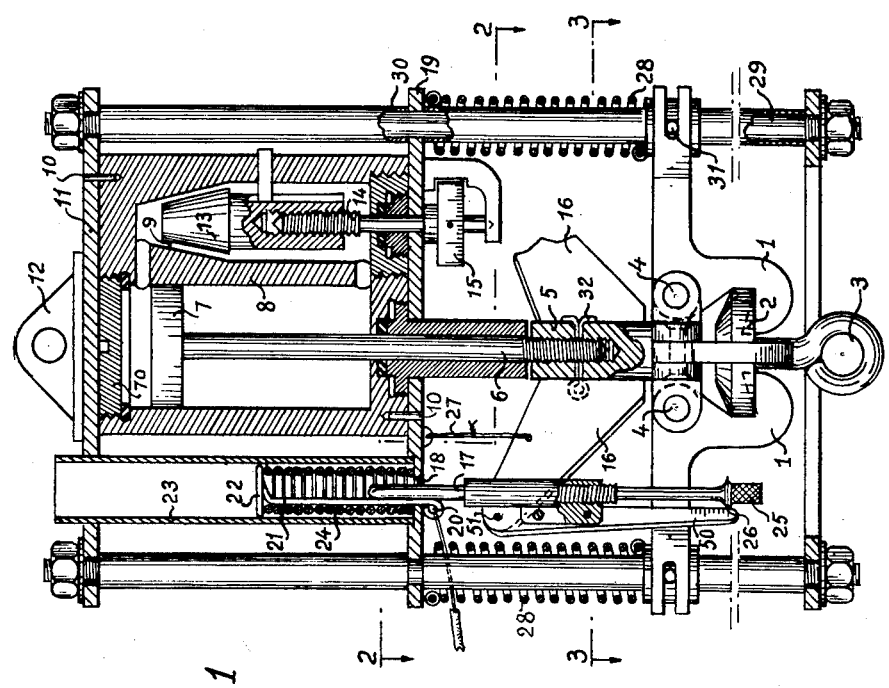
Fig. 1 is a longitudinal axial sectional view along line 1—1 of Fig. 2 of an embodiment of the device according to the invention comprising a mechanism for automatically opening landing parachutes and a mechanism for automatically releasing the load.

Referring first to Figs. 1 to 3, the device according to the invention comprises an automatic release mechanism constituted by a plurality of hooks 1 (four, in the example shown), the ends of which are embedded during the parachuted descent of the load in suitable housings provided for this purpose in a suspension and locking member 2 which has an eyelet 3 in which is secured the parachuted load.

Hooks 1 are articulated around axes 4 at the lower end of an interiorly threaded sleeve 5 in which is screwed the rod 6 of a piston 7 slidably mounted in a cylinder 8. A gudgeon pin 32 holds rod 6 fixedly secured in sleeve 5. 70 is a plug the removal of which permits filling cylinder 8 with an appropriate liquid such as oil which, as piston 7 moves in cylinder 8, passes from one side of said piston to the other one through a passage 9, this assembly constituting a dash-pot capable of braking the displacement of piston 7. Cylinder 8 is secured at 10 on a casing 11 provided with an eyelet 12 in which are secured one or more stabilizing parachutes (not shown). The cross-section of passage 9 of the dash-pot is adjustable by means of a frusto-conical needle 13 controlled by a setting screw 14, the head 15 of which is provided with a graduation in time units (in the example shown).

It is to be noted that the small degree of conicity of needle 13 and its housing permits obtaining an extremely accurate adjustment of the cross-section of the dash-pot passage 9.

The sleeve 5 which is fast with the piston rod carries one or more lugs 16, each supporting a pin 17 extending, when in locking position, in a direction parallel to the axis of the device and which is engaged, at the beginning of the parachuted descent, in a hole 18 provided in a diametral partition 19 of casing 11; in this position, pin 17 holds the lower end of a rod 21—also passing through hole 18—which end is rolled into a ring 20 locked against the lower wall of partition 19. The upper end of rod 21 rolled and folded into a horizontal ring 22 is guided in a vertical tube 23. A spring 24 bears under ring 22, said spring being held in the compressed position shown in Fig. 1, due to locking of the lower end 20 of rod 21, while when pin 17 is extracted from hole 18, said end 20 is released, whereby spring 24 extends suddenly and displaces ring 22 upwards in the guiding tube 23. Ring 20 constitutes on eyelet in which is secured the triggering control of a landing parachute pack, such as the inner wire of a conventional flexible remote control cable.

It is clear that the axial position of pin 17 determines the point of the stroke of piston 7 at which the corresponding landing parachute is triggered under the action of spring 24. As shown, said axial position of pin 17 is adjustable by means of a knurled screw head 25 the position of which is indexed on a graduation 26. As soon as pin 17 is extracted from hole 18, it is tilted around an axis 51, which permits a greater accuracy of the unlocking of ring 20. On the other hand, the lower edge of hole 18 is bevelled to facilitate this tilting and accommodation of ring 20 through hole 18.

Springs 28 mounted around cross-bracing rods 29 are anchored at their upper end, on partition 19 and attached, at their lower end, through a suitable stud-hole articulation 31, on hooks 1.

Finally, before jettisonizing of the load, the device is held in the position shown in Fig. 1 by means of an easily destructible link, such as a string 27, the function of which is to prevent springs 28, then compressed, from acting upon the movable system.

This device operates as follows:

When the load is jettisoned, the stabilizing parachute secured at 12 opens in the usual manner and the shock resulting therefrom determines breaking of link 27. Thereupon, the opposite actions of the stabilizing parachute fast with cylinder 8 of the dash-pot, on the one hand, and the load fast with piston 7 of said dash-pot, on the other hand, cause a relative displacement of said piston with respect to said cylinder towards the lower end thereof. As a result, the oil contained in the lower compartment of cylinder 8 is forced through passage 9 into the upper compartment of said cylinder. The rate of flow of the fluid through passage 9 is determined by the adjustable cross-section of the latter and determines, in turn, the speed at which piston 7 moves with respect to cylinder 8 and, hence, the duration of a given stroke of said piston for a predetermined parachute system acting at 12 and for a predetermined load acting at 3.

Therefore, after a predetermined time indexed on the graduated head screw 15, assuming that the load acting at 5 is equal to that for which the device is calibrated, pin 17 is extracted from hole 18 and causes unlocking of the mechanism triggering the opening means of the corresponding landing parachute. When several landing parachutes (four, in the example shown in Fig. 2) are provided, pins 17 may be adjusted either at a same axial position, so that all landing parachutes open simultaneously, or at different axial positions, so that said parachutes open successively. Furthermore, if the load acting at 3 differs from the calibrated load, the axial position of pins 17 may be varied, so that the time graduation of screw head 15 still gives a correct indication. When the various parachutes open, springs 28 act as compression springs urging hooks 1 towards one another, so that, even if the suspension member 2 bounces upwards upon shocks due to said opening, the load is prevented from dropping. On the contrary, after a predetermined additional relative displacement between piston 7 and cylinder 8, springs 28 are first completely relaxed and, then, begin to act as extension springs urging hooks 1 from one another. Said hooks are, however, still hold in closed position in their housings in the suspension member 2, under the locking action of said member until alighting of the load when said suspension member 2 is litfed with respect to hooks 1, thus releasing the same which are then snapped away by springs 28, thus disconnecting the load from the device which remains fast with the parachute, or parachutes.

The first fraction of the descent of the load which is solely ensured by the stabilizing parachute, or parachutes, may be effected at a high speed, which permits, e. g. in war operations, protecting the parachuted staff or loads against the action of enemy, whereupon the landing parachutes which may be opened at a very low altitude ensure landing at normal safety speed.

In the embodiment of Figs. 4 and 5, the hooks 1 are articulated at 4 between two parallel plates 33 at the lower end of which are cut off two registering notches 54 accommodating the suspension member 2 to permit hooking of the same on the incurved ends of hooks 1, as shown in Fig. 4. The function of plates 33 is to prevent external elements such as cables or the like from penetrating into the hooking device, which ensures a safe operation of the releasing mechanism. Incurved leaf springs 34 secured, e. g. at 35 on one of plates 33 continuously urge hooks 1 towards their opened position shown in Fig. 6, in which the suspension member 2 with the load secured in its eyelet 3 is released. During the first fraction of the descent, hooks 1 are held in their closed position shown in Fig. 4 in which member 2 is imprisoned between the ends of said hooks and notches 54 by means of a positive lock constituted by the lower end of a rod 36 then engaged between two flat portions 37 each provided on one of hooks 1. Rod 36 is fast with the piston 7 of a dash-pot 8 filled with a suitable fluid, such as oil, through a filling aperture provided with a plug 70.

Piston 7 which is provided with one or more calibrated passages such as 47 is urged upwardly by a spring 38. Before parachuting, spring 38 is held in the compressed position shown in Fig. 4 by a rod 39 pressed upon the upper face of piston 7 by a second compression spring 40 far stronger than spring 38. Rod 39 is preferably locked before jettisonizing by a destructible element, such as a chord length 41, interposed between rod 39 and a cross member 42 interconnecting the plates 43 of the casing. Rod 39 carries at its upper end a ring 12a which, as eyelet 12 of the previously described embodiment, is used to secure the parachute, or parachutes, ensuring the descent of the load suspended at 3.

In the alternative embodiment shown in Fig. 6, the end 36 of the rod of piston 7 of the dash-pot is provided with a cut-off and flattened portion 44 the lower edge of which constitutes a double slope 45 adapted to cooperate with complementary slopes 46 provided, for this purpose, on the upper edges of hooks 1, so as to ensure locking of the latter in their open position shown in Fig. 6. Said locking is effected, after disconnection of the load, by spring 40 which presses rod 39 on piston 7 and, thence, the end 45 of rod 36 on the slopes 46 of hooks 1, while slightly compressing spring 38. This arrangement prevents hooks 1 from closing again and gripping unwantedly any part of the load.

Fig. 7 shows in detail the shape of the active ends of hooks 1; each one of said hooks is provided with a midthickness cut-off portion 48, which permits interpenetration of both hooks and cooperation of the latter to support the suspension member 2 in the manner shown in Fig. 4.

This device operates as follows:

The destructible element 41, the presence of which prevents premature release of spring 38 under a pull stress unexpectedly exerted on ring 12a before jettisonizing of the load, is destroyed by the shock upon opening of the first parachute. Spring 40 is then compressed, which ensures, on the one hand, absorption of said shock and, on the other hand, release of piston 7 which, then, begins to move upwards with respect to cylinder 8 under the action of spring 38.

This displacement takes place at a predetermined speed due to the dash-pot action through the calibrated ports 47. Said displacement causes progressive removal of the lock constituted by the lower end of rod 36 in a time which is sufficiently longer than the opening delay of the parachute, or parachutes, so that, as an opening shock takes place, a possible bouncing of member 2 cannot cause opening of hooks 1 under the action of springs 34. Upon unlocking of hooks 1, the latter are further held in the position shown in Fig. 4 but only by the suspension of member 2 under the resultant of the opposed actions of the load and parachute, or parachutes.

In these conditions, as soon as the load touches the ground, member 2 is suddenly lifted with respect to the device and hooks 1 are snapped away into the position shown in Fig. 6 by spring 34, which causes disconnection of the load from the device fast with the parachutes. Spring 40 which, during the parachuted descent, was held compressed under the action of the above-mentioned resultant, is now released, so that it is capable, either of locking hooks 1 in their opened position in the alternative embodiment of Fig. 6, or of bringing the device into its initial position again in the embodiment of Figs. 4 and 5.

In the embodiment shown in Fig. 8, the device according to the invention comprises a cylinder 8 provided with a plug 70 the removal of which permits filling the cylinder with a suitable liquid and a dash-pot piston 7 around the rod 6 of which is mounted a calibrated spring 71. The latter holds piston 7 at its uppermost position, as long as the load shock on opening has not taken place.

The dash-pot piston 7 may be provided with any suitable packing means, such as appropriated rings. Piston 7 offers as many calibrated passages 47 as necessary to ensure, with a suitable accuracy, a given flow rate through the dash-pot between the lower and upper chamber of cylinder 8 separated by piston 7.

In the example shown, piston 7 is secured, e. g. screwed on rod 6, the upper extension of which is provided at 72 with a recess in which a rack type lock 73 is adapted to be engaged. Recess 72 may be extended axially, if desired, as indicated at 72', to permit triggering of certain operations which are not to be controlled as a function of altitude. The unlocking which triggers the automatic control ensuring opening of landing parachutes, or the like, is preferably effected, at a safety altitude as low as possible (in war time, for example, this permits protecting the parachuted troops, or cargo, from enemy fire). This unlocking is controlled, in the example shown, by means of a device, all elements of which are mounted on a supporting plate 74. This device comprises an aneroid 75 which may be provided with any suitable adjustment means (not shown), e. g. as a function of atmospheric pressure or the average altitude of the ground. Aneroid 75 actuates a lever 76 articulated at 77 on said aneroid and pivoted at 78 on the supporting plate 74. The lower arm of lever 76 carries, at a suitably selected position, a compensating calibrated extension spring 79 anchored on body 43, as well as, under said spring 79, a roller 80 the function of which is to lock a barrel 81 containing a clock type spring motor 82 which ensures, through a suitable multiplying gear (diagrammatically shown at 83) the desired unlocking upon triggering under the action of atmospheric pressure on the aneroid.

In the example shown in Fig. 8, a lug member 16, the position of which on the lower end of rod 6 is adjustable by screwing or unscrewing of a threaded portion 96 of said rod in an inner threading 97 of said member, carries two triggering elements, 17a and 17b, acting upon cables 98 and 99, respectively. Said elements, the number of which may be varied within the scope of the invention, trigger simultaneously, or successively, certain operations associated with the parachuted descent of the load, such as automatic opening of one or more landing parachutes.

In the example shown, it may be seen that cable 98 is operative, as soon as piston 7 begins to move, while cable 99 has a delayed action.

In the case when the above-described automatic control fails to operate or if, for any reason, an immediate opening of a landing parachute is suitable, an emergency control 84 may be actuated, the attachment of said emergency control on lever 76 having a limited resistance so as to brake under an excessive pulling stress which is applied thereto.

In Fig. 8, it may be seen that the emergency control 84 passes through an aperture 85 provided in casing 43 which is screwed on cylinder 8 and keyed, e. g. by means of screws (not shown); said casing 43 (within which is mounted the altitude responsive triggering device) being moreover provided with a number of openings, such as 86, to expose aneroid 75 to the action of atmospheric pressure.

In the embodiment of Fig. 8, the automatic releasing device interposed between the load suspended at 3a and the parachute, or parachutes, acting at 12, or at another point fixed with respect to casing 43, is essentially constituted by two hooks 1 articulated at 4a on the lug member 16 and on which are articulated, in turn, at 87 and 88, rods 89 and 90 which carry, at their upper end, as shown at 91, a kind of piston on which is secured, in turn, the lower end of one of springs 28.

The upper end of each spring 28 is anchored in the bottom of one tube 92—93, respectively, which acts as guiding means for the above-described spring-piston rod assembly, as clearly shown in the drawing, and which are articulated at 94 and 95 on cylinder 8.

This automatic releasing mechanism operates in the same manner as that described with reference to Figs. 1, 2, 3.

The invention is not intended to be limited to the example described and shown nor otherwise than defined in the appended claims.

In particular, in the embodiment of Figs. 4 and 5, rod 39 may carry a second piston provided with one or more calibrated passages and acting as a shock absorbing dash-pot, which would permit omitting spring 40.

In this embodiment, it is also possible to use air in the dash-pot instead of oil.

On the other hand, it will be easily understood that the aneroid trigger shown in Fig. 8 may be used at will in any other embodiment shown in the drawings. The use of such an altitude responsive trigger is particularly well adapted to high altitude parachuting and, in this case, it will be convenient to provide suitable means for protecting the dash-pot fluid against cold temperature.

Moreover, in the embodiments of Figs. 1, 2, 3 and Fig. 8, it would be possible to "reverse" the design of the dash-pot, i. e. to make the cylinder fast with the load and the piston fast with the parachute(s) by a suitable modification in the construction within the scope of the invention.

While the invention has been described with particular reference to a preferred embodiment, it is not intended to limit the scope of the invention to the embodiment illustrated, nor otherwise than by the terms of the subjoined claims.

What is claimed is:

1. An automatic parachute release coupling comprising, in combination, a casing for connection with at least one parachute, dash pot means including a piston operating in a cylinder mounted in said casing, a piston rod on said piston, a plurality of hooks each articulated around an axis mounted on said piston rod exteriorly of said cylinder, a suspension member adapted for connection with a load to be parachuted and having a part engageable in interlocking position with said hooks, resilient means to bias said hooks into operative position when said piston is in its original retracted position, said resilient means biasing said hooks into inoperative position upon movement of said piston in said cylinder a predetermined distance from its original position.

2. An automatic parachute release coupling according to claim 1, further comprising mechanical triggering means fast with said piston to trigger at least one operation associated with the parachuting of said load during said movement of the piston over said predetermined distance.

3. An automatic parachute release coupling according to claim 2, comprising a plurality of automatic control mechanisms, each adapted to cause opening of a landing parachute and in which said triggering means are constituted by a plurality of pin members, each engaged, when said piston is at said initial position, in interlocking position with one of said control mechanisms to trigger the same upon being disengaged therefrom after a predetermined stroke of said piston from said initial position.

4. An automatic parachute release coupling according to claim 3, in which each one of said parachute control mechanisms is essentially constituted by a compression spring held in compressed position under engagement therein of said pin member and by a link adapted to control opening of said parachute upon being drawn by the sudden extension of said compression spring to disengagement of said pin member.

5. An automatic parachute release coupling comprising, in combination, a casing adapted for connection with at least one parachute, two hooks each articulated around an axis secured on said casing, a suspension member adapted for connection with a load to be parachuted and having a part engageable in interlocking position with said hooks to lock the same in operative position and adapted to be disengaged therefrom upon alighting of said load, resilient means to urge said hooks towards a load-releasing position, an additional safety positive lock to hold said hooks in operative position, dash-pot means including a cylinder secured in said casing and a piston fast with said lock to unlock the same upon moving along a predetermined stroke from an initial position, a compression spring in said cylinder to impart said piston with said stroke from said position and means to hold said piston armed in a said initial position.

6. An automatic parachute release coupling according to claim 5, in which said arming means are constituted by a link interposed between a part fast with said cylinder and a part fast with said piston, said link being liable to be destructed by the load shock on opening of said parachute.

7. An automatic parachute release coupling comprising, in combination, a casing, two hooks each articulated around an axis secured on said casing, a suspension member adapted for connection with a load to be parachuted and having a part engageable between said hooks to lock the same in operative position and adapted to be disengaged therefrom upon alighting of said load, resilient means to urge said hooks towards a load-releasing position, an additional safety positive lock to hold said hooks in operative position, dash-pot means including a cylinder secured in said casing and a piston fast with said lock to unlock the same upon moving along a predetermined stroke from an initial position, a first compression spring in said cylinder adapted to impart said piston with said stroke from said position, a second compression spring in said cylinder to hold said piston in said position against the action of said first compression spring, a spring-compressing member freely slidable in said cylinder and adapted for connection with at least one parachute to compress said second compression spring so as to release said piston to make the same free of being displaced by said first compression spring upon taking up of the weight of said load by said parachute and a destructible link to hold said second compression spring armed in extended position in contact with said piston until destruction of said link by the load shock on opening of said parachute.

8. An automatic parachute release coupling according to claim 7, in which said lock is furthermore adapted to lock said hook in said load-releasing position upon a given displacement of said piston from the end of said stroke towards said initial position under the action of said second compression spring after said parachute has been relieved from said load.

9. An automatic parachute release coupling comprising, in combination, a casing adapted for connection with at least one parachute, dash-pot means including a vertical cylinder secured in said casing and a piston having a rod member extending downwardly therefrom, a plurality of hooks each articulated around an axis secured on said rod member, a suspension member adapted for connection with a load to be parachuted and having a part engageable in interlocking position with said hooks and adapted to be disengaged therefrom upon alighting of said load, an additional safety locking spring interposed between said casing and each one of said hooks to urge the latter into operative position when said piston is located in said cylinder between an uppermost position and a predetermined intermediate position and into load-releasing position when said piston is located below said intermediate position and means to hold said piston armed in said uppermost position.

10. An automatic parachute release coupling, according to claim 9, in which said arming means are constituted by a destructible link interposed before parachuting between said cylinder and piston to hold the latter armed in said uppermost position against the action of said spring until said link is destructed by a shock on opening of said parachute.

11. An automatic parachute release coupling according to claim 1, further comprising means to adjust the flowing rate through said dash-pot means, which permits varying the duration of said predetermined stroke.

12. An automatic parachute release coupling according to claim 1, including altitude-responsive means constituted by an aneroid, a mechanical spring motor locked in wound condition under the control of said aneroid, a rack having a part engageable in interlocking position with said piston member and a transmission gear between said motor and said rack, said aneroid being adapted to unlock said motor at a predetermined altitude whereby said motor is made free to unlock, in turn, said piston member to hold said piston in said original retracted position down to a predetermined altitude and to release said piston at said altitude.

References Cited in the file of this patent

UNITED STATES PATENTS

| 2,400,165 | Porter | May 14, 1946 |
| 2,414,023 | Cooper | Jan. 7, 1947 |
| 2,483,044 | Gongwer | Sept. 27, 1949 |
| 2,490,558 | Sullivan | Dec. 6, 1949 |
| 2,505,869 | Quilter | May 2, 1950 |
| 2,521,516 | Heidman et al. | Sept. 5, 1950 |
| 2,534,704 | Frieder et al. | Dec. 19, 1950 |
| 2,667,376 | Schlachter | Jan. 26, 1954 |